Patented Dec. 19, 1944

2,365,489

UNITED STATES PATENT OFFICE 2,365,489

WELL-DRILLING MUD

Everett P. Partridge, Beaver, Pa., assignor to Hall Laboratories, Inc., Pittsburgh, Pa., a corporation of Pennsylvania No Drawing. Application February 15, 1943, Serial No. 475,909

11 Claims. (Cl. 252—8.5)

This invention relates to a drilling mud for use in drilling wells.

The present application is a continuation-in-part of my application, Serial No. 351,983, filed August 9, 1940.

In drilling oil wells, for example, it is customary to employ a mud or fluid which serves various purposes which are well known. The drilling mud is circulated from a sump above the ground down through the bore, around the drilling tool where it picks up the chips formed by the drill, and then up the bore to screens where the chips are removed, and to the sump from which the mud is again circulated through the bore. The mud also serves to lubricate the drill pipe, to seal the wall of the bore, and to provide a hydrostatic head which prevents the well from blowing out, in case high formation pressures are encountered.

In order to increase the weight of the drilling mud, it has been customary in the past to add weighting material, such, for example, as barite or hematite. While these or other materials are satisfactory from the standpoint of increasing the weight of the mud, they increase the viscosity of the mud, so that it becomes more difficult to pump. If it is attempted to increase the weight of the mud by increasing the proportion of clay to water either with or without the addition of weighting agents, the viscosity likewise is increased too much.

It has been proposed heretofore to increase the fluidity of the mud by adding thereto a solution of rapidly soluble sodium hexametaphosphate or sodium pyrophosphate. These phosphates have the property of dispersing or deflocculating the mud and making it more fluid. In this manner, when the ratio of solids to water is increased, or weighting materials are added to the mud, the increased viscosity which would result therefrom may be overcome by the use of the rapidly soluble metaphosphate or pyrophosphate.

The use of the rapidly water-soluble metaphosphate or pyrophosphate has resulted in considerable improvement in drilling muds, but is open to certain objections. For example, even if sodium hexametaphosphate or sodium pyrophosphate is added in the solid state to the mud in the sump, it will dissolve in a very short time. The properties of the mud in the sump may thereby be adjusted in a desirable direction insofar as conditions at the surface of the ground are concerned. However, as the mud is circulated downward through the bore, it is subjected to increasing temperatures which may exceed 200° F. The increase in temperature affects the properties of the mud adversely to a greater or less extent and tends to destroy the effects of the dissolved metaphosphate by causing reversion to the ineffective orthophosphate, and likewise, to destroy the effect of the dissolved pyrophosphate both by precipitation as highly insoluble calcium or magnesium pyrophosphate and by reversion to the ineffective orthophosphate.

While the loss of the metaphosphate or pyrophosphate during circulation through the bore may be made up by further addition of these agents at the surface of the ground, it is difficult to control the conditioning of the mud at the surface so that it will exhibit optimum properties at increased temperatures deep in the bore, without at the same time over-treating with respect to surface conditions and hastening the approach of the time when the mud will no longer respond to treatment because of the accumulation of chemicals in it.

In accordance with the preferred method of the present invention, finely divided solid particles of a slowly soluble phosphate glass are introduced into the mud and are circulated with the mud down the bore. These slowly soluble particles dissolve continuously in the mud to maintain the desired properties in it and particularly to maintain the mud in a suitably fluid condition.

The slowly soluble phosphate glasses which may be added to the mud according to the present invention contain about 37 to 65 mol per cent of $P_2O_5$. The phosphate glass also contains one or more oxides of the metals calcium, strontium, barium, magnesium or zinc, all of which metals fall in the second group of the periodic table. The phosphate glass may contain one or more oxides of the alkali-metals, for example, sodium oxide or potassium oxide, in addition to the oxides of the second-group metals calcium, strontium, barium, magnesium and zinc. In all cases, however, the molar ratio of the second-group metal oxides—i. e. the oxides of calcium, strontium, barium, magnesium and zinc—to the alkali-metal oxides is at least about 1:1. For a phosphate glass containing a fixed mol per cent of $P_2O_5$, the rate of solution of the glass increases as the mol ratio of alkali-metal oxide to second-group metal oxide increases. A phosphate glass containing only $P_2O_5$ and second-group metal oxide, for example, a glass having a molar ratio of $1CaO:1P_2O_5$, which corresponds to calcium metaphosphate $Ca(PO_3)_2$, has a very low rate of solution. On the other hand, a phosphate glass containing only $Na_2O$ and $P_2O_5$—for example, one containing $1Na_2O.1P_2O_5$, which glass is commonly known as sodium hexametaphosphate or Graham's salt—has a very high rate of solution. Phosphate glasses containing both $Na_2O$ and $CaO$ have rates of solution depending upon the relative proportions of the $Na_2O$ and $CaO$.

The rate of solution of phosphate glasses varies over an extremely wide range. Thus 100 grams of the sodium phosphate glass commonly known as sodium hexametaphosphate or Graham's salt, when used in the commercial form of flat pieces of broken glass approximately $\frac{3}{32}$ inch thick, may readily be dissolved completely in one liter of water in less than an hour, thus producing a concentration of 100,000 P. P. M. Even higher concentrations are easily and rapidly obtained. When this readily soluble Graham's salt is ground to pass a 100-mesh screen and be retained on a 200-mesh screen, 100 grams of the resultant powder stirred in 1 liter of water will dissolve in 1 minute. A second quantity of 100 grams of powdered Graham's salt may then be dissolved almost as rapidly, and likewise a third, producing a concentration of 300 grams of the Graham's salt in 1000 grams of water, or 300,000 parts per million parts of water within a total time of only a few minutes. The rate of dissolving of further quantities becomes somewhat slower because of the increasing viscosity of the solution; but a concentration of 1500 grams of the Graham's salt in 1000 grams of water may easily be attained within an hour. The phosphate content of this solution expressed as $P_2O_5$ would be 1050 grams in 1000 grams of water or 1,050,000 parts of $P_2O_5$ per million parts of water.

In contrast to this very rapid dissolving of powdered Graham's salt to produce very concentrated solutions, the materials contemplated for use according to the present invention, when ground to pass a 100-mesh screen and be retained on a 200-mesh screen, dissolve only at a very slow rate when 100 grams of the powder is stirred in 1 liter of water. The results of tests upon five representative glasses are shown in Table I.

TABLE I

*Relative rates of solution of phosphate glasses*

| No. | Composition mol per cent | Amount dissolved when 100 g. of −100+ 200-mesh glass is stirred in 1 liter of water for 1 hour expressed as— | |
|---|---|---|---|
| | | Grams of $P_2O_5$ | Parts of $P_2O_5$ per million parts of water |
| 3 | $50BaO, 50P_2O_5$ | 0.03 | 30 |
| 1 | $50CaO, 50P_2O_5$ | 0.25 | 250 |
| 6 | $16.7Na_2O, 33.3CaO, 50P_2O_5$ | 1.1 | 1,100 |
| 14 | $25Na_2O, 25CaO, 50P_2O_5$ | 3.8 | 3,800 |
| 7 | $20Na_2O, 40MgO, 40P_2O_5$ | 0.35 | 350 |
| 5 | $20K_2O, 20ZnO, 60P_2O_5$ | 9.8 | 9,800 |

The first four materials each contain 50 mol per cent of $P_2O_5$, thereby corresponding to the metaphosphate composition. Of these, the first two illustrate the individual differences in behavior resulting from the use of oxides of various metals of the second group of the periodic table. Under comparable conditions, No. 1, the glass containing 50 mol per cent of CaO, dissolves about 8 times more rapidly than No. 3, the glass containing 50 mol per cent of BaO, the remaining 50 mol per cent in each case being $P_2O_5$.

The effect of substituting an alkali-metal oxide, $Na_2O$, for part of the metal oxide of the second group, CaO, in No. 1 glass is shown by Nos. 6 and 14. When CaO has been replaced on a molar basis by $Na_2O$ to the extent of $2CaO:1Na_2O$ in No. 6, and to the extent of $1CaO:1Na_2O$ in No. 14, the rates of solution have been increased somewhat more than 4 and 15 times, respectively.

In each case in the particular series just noted, the total metal oxide comprises 50 mol per cent, the remaining 50 mol per cent being $P_2O_5$.

Other series are possible in which the molar content of $P_2O_5$ may have some value between 37 and 65 per cent. No. 7 is one of the infinite number of possible compositions containing less than 50 mol per cent of $P_2O_5$; the mol percentages of $20Na_2O$, $40MgO$, and $40P_2O_5$ may also be expressed as a mol ratio of $1Na_2O:2MgO:2P_2O_5$. The mol ratio of total metal oxide to $P_2O_5$ is $3:2$. This glass has a rate of solution almost as low as that of No. 1 glass.

Similarly, No. 5 is one of the infinite number of possible compositions containing more than 50 mol per cent of $P_2O_5$. Its composition in terms of mol ratios is $1K_2O:1 ZnO:3P_2O_5$, corresponding to a ratio of total metal oxide to $P_2O_5$ of $2:3$. This glass has a rate of solution about 40 times that of No. 1 glass, but only of the order of one-hundredth that of the readily soluble sodium phosphate glass known as sodium hexametaphosphate or Graham's salt.

The phosphate glasses of the present invention, although having very slow rates of solution as compared with Graham's salt, have no limiting solubility.

The present invention covers the use of phosphate glasses which, while having a rate of solution sufficient to materially reduce the viscosity of a previously untreated mud to which the phosphate glass is added and the mud is heated for a substantial period of time, say for two hours at 80° C., nevertheless have an entirely different and lower order of rate of solution than the rapidly soluble glassy sodium metaphosphate commonly known as sodium hexametaphosphate or Graham's salt. The term "slowly soluble" is used in the claims to define such phosphate glasses. Among the slowly soluble phosphate glasses, I preferably use one of such character that when 100 grams of it ground to pass a 100-mesh screen and be retained on a 200-mesh screen is added to one liter of water at room temperature and stirred, there will be dissolved in one hour from 0.02 gram to 10 grams of phosphate expressed as $P_2O_5$, preferably from 0.05 gram to 5.0 grams.

Commercially, the phosphate glasses of the present invention may be made from phosphoric acid and a convenient compound of the desired metal or metals, such as the oxide, hydroxide, carbonate or chloride. The mixture of phosphoric acid and compound of the desired metal or metals is heated to fusion and the melt is rapidly cooled to produce the phosphate glass. The amount of phosphoric acid used in the mixture is such as to produce a glass containing about 37 to 65 mol per cent of $P_2O_5$. If a glass consisting substantially of $P_2O_5$ and CaO is desired, the starting materials which are to be fused may comprise a mixture of phosphoric acid and calcium carbonate. If the desired phosphate glass is to contain $Na_2O$ as well as CaO and $P_2O_5$, the starting mixture may comprise calcium carbonate, sodium carbonate and phosphoric acid. In all cases, however, the ingrelients of the mixture are in such proportion that the resultant phosphate glass contains about 37 to 65 mol per cent of P2O5 and the molar ratio of the oxides of calcium, strontium, barium, magnesium or zinc to the alkali-metal oxides is at least about 1:1. Phosphate glasses having such compositions have the desired low rate of solution, so that when added in solid particle form to a drilling mud, they slowly dissolve in the mud, particularly when subjected to increasing temperatures, thereby producing and maintaining the desired dispersion or deflocculation of the mud more advantageously than do the rapidly soluble sodium metaphosphate glass or crystalline sodium pyrophosphate hitherto employed. The advantage of using a slowly soluble phosphate glass in a drilling mud is illustrated by the following:

A mud was made up to contain 10% of clay, 10% of ground barite, and 3% of bentonite, and was aged with stirring. To a 2000-gram portion of the aged mud was added 3 grams of the material to be tested, ground to pass a 200-mesh screen. The sample was then thoroughly mixed and allowed to stand 0.5 hour, when the viscosity and 5-minute gel strength were determined by means of a McMichael viscosimeter. The sample was then allowed to stand overnight, approximately 15 hours, after which it was mixed thoroughly, and the viscosity and gel strength were again determined. The sample was then heated to 80° C. for 2 hours and allowed to cool and stand overnight, after which the viscosity and gel strength were again determined.

The original mud with no addition of treating chemical had a viscosity of 64 poises at 20 R. P. M. and a 5-minute gel strength of 341 on an arbitrary scale. The effect of treatments with various phosphate glasses is shown in Table II.

Material No. 3 is a phosphate glass containing BaO in proportion corresponding to barium metaphosphate Ba(PO3)2.

Materials 4, 5, 6 and 7 are mixed phosphate glasses containing P2O5 with Na2O or K2O and either CaO, ZnO or MgO.

Material No. 4 contains Na2O, CaO and P2O5 in the molar ratio of 2Na2O:2CaO:3P2O5. The molar ratio of CaO to Na2O is 1:1.

In material No. 5, the molar ratio is $$1K_2O : 1ZnO : 3P_2O_5$$

The molar ratio of ZnO to K2O is 1:1.

In material No. 6, the molar ratio is $$1Na_2O : 2CaO : 3P_2O_5$$

The molar ratio of CaO to Na2O is 2:1.

In material No. 7, the molar ratio is $$1Na_2O : 2MgO : 2P_2O_5$$

The molar ratio of MgO to Na2O is 2:1.

It may be found possible by extended investigation to produce phosphate glasses with desirable low rates of solution containing somewhat less than about 37 mol per cent of P2O5. However, it is difficult to prevent crystallization upon cooling melts containing less than 37.5 mol per cent of P2O5, corresponding to the polyphosphate known as the tripolyphosphate whose empirical formula of $M'_5P_3O_{10}$ or $M''_5(P_3O_{10})_2$ expresses a molar ratio of $5M'_2O:3P_2O_5$ or $5M''O:3P_2O_5$, M' standing for monovalent alkali-metal and M'' for bivalent second-group metal. No one has yet succeeded in producing a phosphate glass containing as little as 33.3 mol per cent of P2O5, corresponding to a molar ratio of $2M'_2O:1P_2O_5$ or $M''O:1P_2O_5$, having the overall composition of pyrophosphate whose empirical formula is $M'_4P_2O_7$ or $M''_2P_2O_7$. While phosphate glasses

TABLE II

| No. | Composition of treating material mol per cent | Viscosity of mud, poises | | | 5-min. gel strength of mud arbitrary units | | |
|---|---|---|---|---|---|---|---|
| | | 0.5 hr. | Overnight | 2 hr. at 80° C. to overnight | 0.5 hr. | Overnight | 2 hr. at 80° C. to overnight |
| | 50Na2O, 50P2O5 (sodium metaphosphate glass) | 10.5 | 13.5 | 35.5 | 82 | 94 | >125 |
| 1 | 50CaO, 50P2O5 | 55.5 | 27 | 19.5 | >125 | 117 | 92 |
| 2 | 45CaO, 55P2O5 | 48 | 20.7 | 20 | 235 | 95 | 95 |
| 3 | 50BaO, 50P2O5 | 54 | 11.5 | 18 | 273 | 66 | 89 |
| 4 | 28.6 Na2O, 28.6 CaO, 42.8 P2O5 | 16 | 13 | 13.5 | 78 | 68.5 | 77 |
| 5 | 20K2O, 20ZnO, 60P2O5 | 31 | 18.5 | 14.7 | >125 | 82 | 74 |
| 6 | 16.7Na2O, 33.3CaO, 50P2O5 | 39 | 16 | 15.5 | >125 | 78 | 77 |
| 7 | 20Na2O, 40MgO, 40P2O5 | 51.5 | 29.5 | 23.5 | >125 | 125 | 112 |

Each of the seven numbered slowly soluble phosphate glasses produced a decided dispersing or deflocculating effect upon the mud, as shown by the decrease in viscosity from the value of 64 for the untreated mud. Each of the slowly soluble phosphate glasses proved superior to the rapidly soluble sodium metaphosphate glass with respect to maintaining a lower viscosity in the mud after heating. These results are believed to be due to the fact that these materials dissolve slowly to maintain the amount of phosphate glass in the solution phase in the mud necessary for dispersing or deflocculating, replacing continuously the active material which is being lost due to reversion or precipitation.

Referring to Table II, phosphate glass No. 1 contains 50 mol per cent CaO and 50 mol per cent P2O5, or a molar ratio of 1CaO:1P2O5, which corresponds to calcium metaphosphate Ca(PO3)2. In material No. 2, the molar ratio of P2O5 to CaO is somewhat higher than that of material No. 1.

containing more than about 65 mol per cent of P2O5 can readily be produced, the glasses are not very suitable for treating drilling mud because of their highly acidic nature and relatively high rate of solution.

In the treatment of drilling mud with slowly soluble phosphate glasses, the treating material apparently must dissolve in the liquid phase of the mud before it can produce its desired effect. The rate at which treating material actually becomes available depends, therefore, not only on the fundamental rate of solution of the material, which is a function of its chemical composition, but also on the area of surface of the material exposed, which depends on its particle size and the amount added to the mud. In general, the material need be ground only to a particle size sufficiently small to allow it to remain in suspension in the mud, but if a material with a particularly low rate of solution is to be employed, it may be ground more finely in order to avoid the necessity for maintaining a large amount of the treating material as solid particles in the mud.

In carrying out the process of conditioning well-drilling mud by means of slowly soluble phosphate glass, I prefer to maintain a reserve of undissolved solid particles of the treating material in the mud as it is circulated throughout the cycle, adding more of the treating material to the mud continuously or at intervals to make up the unavoidable losses, and controlling this makeup by testing the properties of the mud at intervals. The test methods heretofore employed are suitable in which the viscosity of the mud is measured in an approximate manner by the time of efflux of a given quantity from a Marsh funnel, or more precisely by a viscometer. The tests should preferably be carried out with the mud held at approximately the maximum temperature in the bore hole, although an inexperienced operator may be able to maintain satisfactory control by testing the mud at its temperature at the surface of the ground.

Initial adjustment of a mud to the desired level of viscosity may require the addition at the start of a greater amount of slowly soluble phosphate glass than would have been necessary if rapidly soluble sodium metaphosphate or sodium pyrophosphate had been used. The additional amount of the slowly soluble glass required to maintain optimum conditions during further operation and the total amount required to complete a bore will, however, be less than if a rapidly soluble treating material were employed. So-called "cutting," "clabbering," or over-treatment of the mud by the added chemicals will accordingly be delayed or entirely obviated.

A unique advantage of the process herein described is the automatic response to increase in temperature as the mud circulates down the bore. When the rapidly soluble phosphate glasses are introduced into and dissolve in the mud at the surface of the ground, the effect of increase in temperature as the mud descends the bore is to accelerate the loss of treating chemical by precipitation or reversion or both undesirable reactions. In contrast, when finely divided slowly soluble phosphate glasses are introduced into the mud, only a limited amount goes into solution. As the temperature increases during passage down the bore, there is an increase in the rate of loss of the effective chemical in solution, but this is offset by the increased rate at which the solid particles of the treating material dissolve to supply fresh chemical to the solution.

Another advantage of the slowly soluble phosphate glasses is the fact that they can be stored and handled in humid atmospheres with much less tendency toward caking than is exhibited by the readily soluble molecularly dehydrated phosphates heretofore employed.

Slowly soluble phosphate glasses of high density derived from the heavy metal barium and containing at least one mol of barium oxide for each mol of alkali-metal oxide may be advantageously used, not only to disperse or deflocculate drilling mud but also at the same time to increase its density. Where such double use is contemplated, it may be found desirable to add considerable quantities of a material with a particularly low rate of solution, such as barium metaphosphate or other phosphate glass containing a considerable amount of barium oxide.

The slowly soluble phosphate glasses, although particularly suitable for use in the conditioning of mud in the drilling of bore holes, may also be utilized to advantage as dispersing or deflocculating agents in the treatment of clays, pigments, fillers and finely divided oxides, salts and mineral matter in general.

The invention is not limited to the preferred materials or methods but may be otherwise embodied or practiced within the scope of the following claims:

I claim:

1. Well drilling mud comprising an aqueous dispersion of clay and a slowly soluble phosphate glass containing about 37 to 65 mol per cent of $P_2O_5$, said phosphate glass containing material of the class consisting of the oxides of the second-group metals Ca, Sr, Ba, Mg and Zn and the oxides of the alkali-metals, the molar ratio of said second-group metal oxides to said alkali-metal oxides being at least about 1:1.

2. Well drilling mud comprising an aqueous dispersion of clay and a slowly soluble phosphate glass containing about 37 to 65 mol per cent of $P_2O_5$, the remainder of said phosphate glass consisting substantially of oxide of second group metal of the class consisting of Ca, Sr, Ba, Mg and Zn.

3. Well drilling mud comprising an aqueous dispersion of clay and a slowly soluble phosphate glass containing about 37 to 65 mol per cent of $P_2O_5$, the remainder of said phosphate glass consisting substantially of oxide of second-group metal of the class consisting of Ca, Sr, Ba, Mg and Zn and of oxide of the alkali-metals, the molar ratio of said second-group metal oxides to said alkali-metal oxides being at least about 1:1.

4. Well drilling mud comprising an aqueous dispersion of clay and a slowly soluble phosphate glass containing about 37 to 65 mol per cent of $P_2O_5$, the remainder of said phosphate glass consisting substantially of oxide of second-group metal of the class consisting of Ca, Sr, Ba, Mg and Zn and of oxide of the alkali-metals, the molar ratio of said second-group metal oxides to said alkali-metal oxides being from about 1:1 to 2:1.

5. Well drilling mud comprising an aqueous dispersion of clay and a slowly soluble phosphate glass containing $Na_2O$, $CaO$ and $P_2O_5$ in about the molar ratio of $1Na_2O:2CaO:3P_2O_5$.

6. Well drilling mud comprising an aqueous dispersion of clay and solid particles of a slowly soluble phosphate glass containing about 37 to 65 mol per cent of $P_2O_5$, said phosphate glass containing material of the class consisting of the oxides of the second-group metals Ca, Sr, Ba, Mg and Zn and the oxides of the alkali-metals, the molar ratio of said second-group metal oxides to said alkali-metal oxides being at least about 1:1.

7. Well drilling mud comprising an aqueous dispersion of clay and solid particles of a slowly soluble phosphate glass containing about 37 to 65 mol per cent of $P_2O_5$, said phosphate glass containing material of the class consisting of the oxides of the second-group metals Ca, Sr, Ba, Mg and Zn and the oxides of the alkali-metals, the molar ratio of said second-group metal oxides to said alkali-metal oxides being at least about 1:1, said slowly soluble phosphate glass particles having a rate of solution of the order of not more than about $1/100$ that of the sodium phosphate glass known as Graham's salt.

8. Well drilling mud comprising an aqueous dispersion of clay and solid particles of a slowly soluble phosphate glass containing about 37 to 65 mol per cent of $P_2O_5$, said phosphate glass containing material of the class consisting of the oxides of the second-group metals Ca, Sr, Ba, Mg and Zn and the oxides of the alkali-metals, the molar ratio of said second-group metal oxides to said alkali-metal oxides being at least about 1:1, said slowly soluble phosphate glass particles being of such character that when 100 grams of it ground to pass a 100-mesh screen and be retained on a 200-mesh screen is added to 1 liter of water at room temperature and stirred there will be dissolved in one hour from 0.02 grams to 10 grams of phosphate expressed as $P_2O_5$.

9. Well drilling mud comprising an aqueous dispersion of clay and solid particles of a slowly soluble phosphate glass containing about 37 to 65 mol per cent of $P_2O_5$, said phosphate glass containing material of the class consisting of the oxides of the second-group metals Ca, Sr, Ba, Mg and Zn and the oxides of the alkali-metals, the molar ratio of said second-group metal oxides to said alkali-metals, said alkali-metal oxides being at least about 1:1, said slowly soluble phosphate glass particles being of such character that when 100 grams of it ground to pass a 100-mesh screen and be retained on a 200-mesh screen is added to 1 liter of water at room temperature and stirred there will be dissolved in one hour from 0.05 grams to 5.0 grams of phosphate expressed as $P_2O_5$.

10. The process of dispersing or deflocculating finely divided mineral matter in an aqueous medium, which comprises adding thereto an effective amount of solid particles of a slowly soluble phosphate glass containing about 37 to 65 mol per cent of $P_2O_5$, said phosphate glass containing material of the class consisting of the oxides of the second group metals Ca, Sr, Ba, Mg and Zn and the oxides of the alkali-metals, the molar ratio of said second-group metal oxides to said alkali-metal oxides being at least about 1:1, said addition acting to disperse or deflocculate the mineral matter.

11. A dispersion of finely divided mineral matter in an aqueous medium, said dispersion containing an effective amount of solid particles of a slowly soluble phosphate glass containing about 37 to 65 mol per cent of $P_2O_5$, said phosphate glass containing material of the class consisting of the oxides of the second-group metals Ca, Sr, Ba, Mg and Zn and the oxides of the alkali-metals, the molar ratio of said second-group metal oxides to said alkali-metal oxides being at least about 1:1, said phosphate glass acting to disperse or deflocculate the mineral matter.

EVERETT P. PARTRIDGE.